United States Patent [19]
Ryan

[11] 3,843,153
[45] Oct. 22, 1974

[54] VEHICLE AXLE SUPPORT DEVICE FOR TANDEM TRAILERS AXLE

[76] Inventor: Charles Wilson Ryan, Box 342, Fernley, Nev. 89408

[22] Filed: Apr. 2, 1973

[21] Appl. No.: 346,752

[52] U.S. Cl............................ 280/150 G, 180/24.02
[51] Int. Cl............................................. B60r 27/00
[58] Field of Search............. 180/22 D, 22 E, 24.02; 280/150 G, 104.5 R, 81 R; 24/243 D; 248/361 A

[56] References Cited
UNITED STATES PATENTS

| 1,421,781 | 7/1922 | Holmes | 280/150 G |
| 2,767,999 | 10/1956 | Gouirand | 280/104.5 R |
| 2,953,390 | 9/1960 | Hogstrom | 280/104.5 R |
| 3,340,946 | 9/1967 | Whitehead | 180/24.02 |

Primary Examiner—David Schonberg
Assistant Examiner—Terrance L. Siemens
Attorney, Agent, or Firm—William S. Britt; David V. Trask; Richard F. Bojanowski

[57] ABSTRACT

A detachable axle support device for attachment to a longitudinal beam support of a vehicle and having chain means to engage and support an end of an axle beneath said beam although the pneumatic tire at that end of the axle is deflated. The device comprises a pair of plates conformed to engage each other and clamp therebetween a flange of a channel beam or I-beam longitudinal member by means of a bolt through both plates. Opposite ends of a length of chain engage a portion of the bolt means extending above the uppermost of said plates.

10 Claims, 7 Drawing Figures

VEHICLE AXLE SUPPORT DEVICE FOR TANDEM TRAILERS AXLE

BACKGROUND

1. Field

The invention relates to a detachable device for temporarily supporting one end of a tandem axle of a tandem axle trailer so that said trailer can be moved although the pneumatic tire near said axle end is deflated.

2. State of the Art

Support devices for supporting an end of an axle of a vehicle or trailer is illustrated by the following patents:

Houfek, et al., U.S. Pat. No. 3,608,923 discloses hook members permanently attached to the frame members of a tandem axle vehicle. One hook is attached for each axle end, a tandem axle vehicle having four hooks attached to frame members whereby a hook can be engaged under either axle near either end to support that end of the axle in the event the pneumatic tire on the end of the axle is deflated.

The concept of retracting an axle is illustrated by the Richow, U.S. Pat. No. 3,096,995 and MacPhee, U.S. Pat. No. 2,724,449, patents wherein retraction means is provided for retracting one axle of tandem axles so that the tires at both ends of the axle are removed from contact with a road surface.

The concept of snubbing or holding an axle in a restrained position during jacking of a vehicle with a bumper jack is illustrated by the following patents:

Dionne, U.S. Pat. No. 3,117,801, discloses a flexible cable having one end permanently attached to a vehicle frame member and the other end looped about an axle near an end thereof so that the body of the vehicle does not have to be unnecessarily raised off the ground to change a tire.

Dahleen, U.S. Pat. No. 2,454,996, discloses lever devices for attaching near each axle end with a cable connecting each lever to an axle so that positioning of the lever can hold the axle at various positions relative to the body of the vehicle to facilitate changing a tire while the vehicle is supported with a bumper jack.

Kilmer, U.S. Pat. No. 2,473,338, discloses a detachable hook which may be engaged by its upper end to a plate attached to the vehicle body with the hook portion engaging an axle to prevent the axle from dropping unduly during raising of the vehicle body with a bumper jack.

DESCRIPTION

The instant invention comprises a detachable clamp formed of an upper plate and a lower plate forced together by at least one bolt to securely engage the flange of a channel frame member of a tandem axle vehicle. The lower and upper plates may be hinged at one edge but are preferably unconnected except by the bolt means. Chain means attached at each end to the bolt means extending above said upper plate is looped beneath an axle near an end thereof to support said axle although the tire normally supporting said axle end is deflated.

The invention is particularly useful on travel trailers hauled by automobiles or light trucks. Such tandem axle trailers generally have only four tires supporting the trailer. If one of these tires becomes deflated the trailer cannot be towed without permanent damage to the tire and wheel because the weight of the springs, brake drum, axle and wheel cause the axle end to drop unless restrained. Even though the wheel is removed the trailer cannot be towed on the remaining wheel because the springs allow the wheel drum to sag to the point of touching or very near touching the ground. A permanent snubbing or restraining means attached between the frame and the axle would not allow the spring near the axle end to perform its function in permitting the axle to have dampened up and down motion.

The device of the instant invention is particularly useful inasmuch as only one clamp device needs to be carried for a tandem axle vehicle or trailer. The clamp is attached to a frame member above an axle end. The axle is jacked up to a normal position and chain means looped beneath the axle end with the free ends engaging the bolt means extending above the clamp means.

Further description of the invention may be facilitated by reference to the accompanying drawings.

Figure 1:
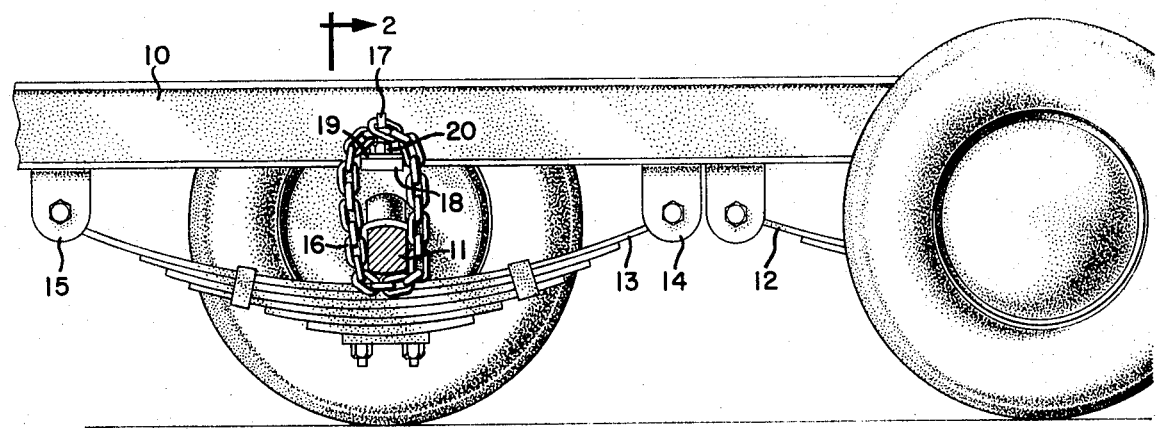
FIG. 1 is a fragmentary elevational view of a tandem axle trailer with one wheel removed and a clamp support device supporting an axle.

A portion of a travel trailer or other vehicle with tandem axles and a single wheel on each axle end is illustrated in FIG. 1. A tandem axle trailer, on which the instant device is particularly useful, has a pair of axles in close adjacency, as illustrated in FIG. 1. The tandem axles are usually located aft of the mid-longitudinal point of the trailer. The forward portion of the trailer is at least partially supported through a tongue attached to the towing vehicle.

As can be seen from FIG. 1, a flat tire on any of the four trailer wheels allows the axle end near the flat tire to drop. Since permanent damage can be done by driving on a deflated tire supporting weight, it is necessary to stop immediately and change the wheel and tire. Oftentimes, traffic congestion or road conditions preclude immediate changing of the tire and wheel.

The device of the instant invention permits the axle end having a flat tire adjacent thereto to be supported in its usual position relative to the frame member so that the trailer can be towed without the flat tire being damaged or overheated.

The tandem axle arrangement of FIG. 1 comprises a channel frame member 10 having a forward axle (not shown) and a rear axle 11, each connected by spring members 12 and 13 to frame member 10 by spring yokes 14 and 15. Each axle is supported by a wheel and pneumatic tire on each end. The rear axle 11 of FIG. 1 is illustrated with one tire and wheel removed and with the brake drum not shown. The axle end near the removed wheel and tire would normally drop below its usual position, often dropping to a position such that the brake drum contacts the ground.

In FIG. 1 the axle 11 is supported by a chain member 16 which is attached near each free end by links of the chain placed over bolt means 17. Bolt means 17 passes through lower plate 18 and upper plate 19 which are clamped tightly together by nut 18 on bolt 17. The lower flange of channel 10 is clamped between the upper and lower plates 18 and 19.

Figure 2:
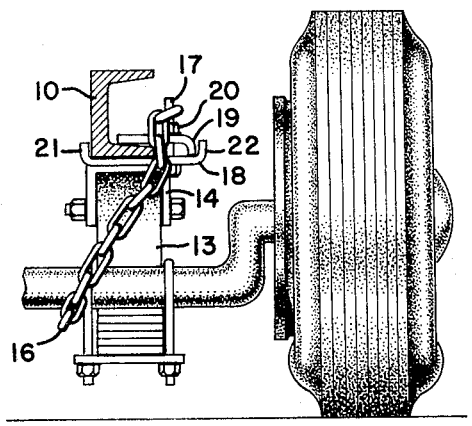
FIG. 2 is a sectional view along section lines 2—2 of FIG. 1.

The chain means 16 preferably passes beneath axle 11 on the inside of spring means 13 so that the chain cannot slip from its intended position about axle 11, as illustrated in FIG. 2.

Figure 3:
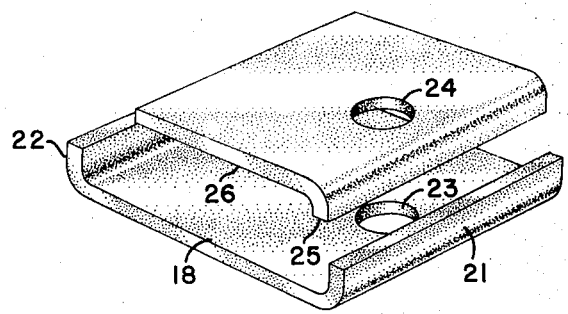
FIG. 3 is a perspective exploded view of the upper and lower plates of the clamp device.

Although a flat plate can be utilized for one of the clamp plates it is preferred that both have at least one curved edge. Lower plate 18 has a pair of flared lips 21 and 22 so that the lower plate 18 can embrace the channel frame member 10 (See FIG. 2). In FIG. 3 the curved edges of plate 18 are shown to comprise an approximately 90° bend about a radius of curvature of about ½ to about 1 inch. The degree and radius of curvature may vary substantially, however, lips on opposed edges of plate 18 are preferred which extend a sufficient distance above the upper surface of plate 18 and at a sufficiently sharp angle from the upper surface of plate 18 to embrace the lower lateral surface of a beam member to hold plate 18 securely in position even when subjected to substantial lateral forces.

One curved lip of plate 18 is preferably along the edge closest to hole 23 with the other curved lip opposite the first curved edge. The distance between curved lips is from about 2½ to about 4 inches or more. Most tandem axle travel trailers, for example, have a longitudinal beam member about 1½ inches in width. For safest performance, the flared lips of plate 18 should embrace the beam support therebetween so that the flared lips extend above the base of the beam support. (See FIGS. 2 and 4). The width of plate 18 is preferably about 1 inch to about 1½ inches wider than the beam width to provide space for the bolt means and the flared lip of plate 19 to fit between the edge of the channel flange and the flared lip of plate 18.

Upper plate 19 has a slightly smaller lateral width than plate 18. Plate 19 has a flared lip 23 adjacent hole 24. Flared lip 23 extends below the lower surface of plate 19 about one-fourth to about one-half inch. The distance between edge 25 and the lower surface 26 of upper plate 19 preferably approximates the thickness of the frame member flange which is clamped between the upper and lower plates. The weight of tandem axle travel trailers necessitates a sturdy steel channel member for its frame. Many of these trailers utilize a channel which is about 4 inches high, and about 1½ inches wide with a flange about one-fourth to about one-half inch thick. The plates 18 and 19 should also be sturdy, for example, steel plates having a thickness of about one-fourth inch or greater.

Figure 4:
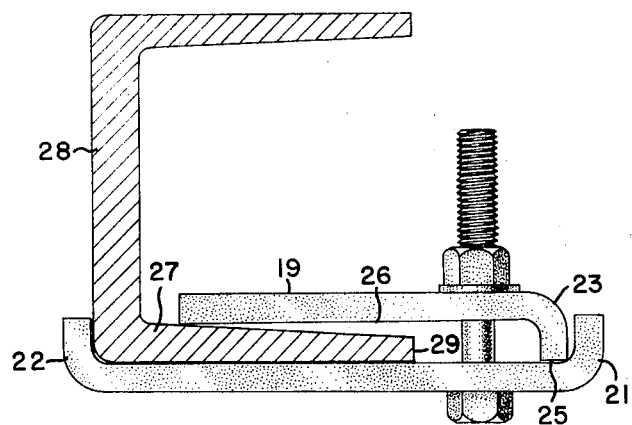
FIG. 4 is an elevational end view of the clamp device engaging the lower flange of a channel frame member.

The relationship of the various parts of the instant clamp device are further illustrated in FIG. 4. Plate 18 has a pair of opposed flared lips 21 and 22 which embrace the flange 27 and the lower portion of the web 28 of a channel member. Edge 25 of lip 23 of the upper plate 19 is forced firmly against the upper surface of plate 18. Edge 25 acts as a fulcrum so that a clamping force can be exerted by the upper and lower plates 18 and 19 when nut 20 is tightened on bolt 17. A space of about ¾ to about 1½ inches is preferred to exist between flange edge 29 and upper plate edge 25. A 1 inch spacing is provided when lower plate 18 is about 3 inches wide since typical channels have a flange width of about 1½ inches. It is preferred that bolt 17 be located relatively close to flange edge 29 so that a maximum amount of clamping force is exerted upon flange 27 by lower and upper plates 18 and 19 upon tightening of nut 20 on bolt 17. If bolt 17 and fulcrum edge 25 are located far from flange edge 29, for example, three or four inches, a sufficient clamping force cannot be exerted upon flange 27 by tightening of nut 20 on bolt 17. Also, since bolt 17 supports chain member 16 it is preferred that bolt 17 be located closely adjacent flange edge 29 so that the least torque possible is exerted on plate 18.

Figure 5:
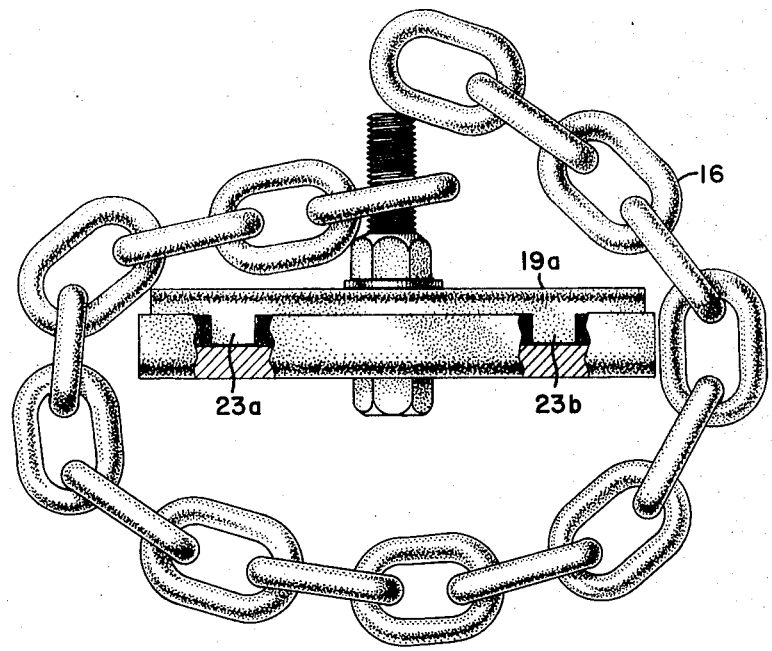
FIG. 5 is an elevational view showing the chain means engaging the bolt means of the clamp device.

Although the flared lip of the upper plate may extend the entire length of the plate, a fulcrum point to contact the lower plate between the bolt hole and the edge closely adjacent thereto may comprise one or more projections 23a and 23b having a length substantially less than the entire length of the upper plate may be utilized, as illustrated in FIG. 5. The projections 23a and 23b may have a length of from about ¼ inch to about 1 inch. Projections 23a and 23b project about one-fourth to about one-half inch below the lower surface of upper plate 19a. Also, shown in FIG. 5 is the manner in which the links 16a and 16b of chain 16 fit over bolt 17. Each link of the chain is the same size so that maximum possible variation in the length of the chain loop depending from bolt 17 is attainable by affixing various of the links over bolt 17.

Figure 6:
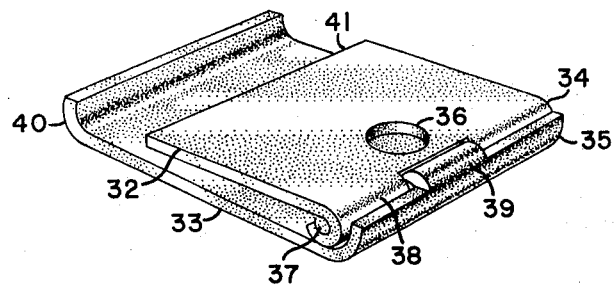
FIG. 6 is a perspective view of a hinged clamp device.

An alternative clamp device is illustrated in FIG. 6 wherein the upper plate 32 and the lower plate 33 are interconnected at the edges 34 and 35 which are most closely adjacent to the bolt holes in each plate (only bolt hole 36 in the upper plate being visible in FIG. 6). The hinge is preferably a bolt 37 passing through barrels 38 of upper plate 32 and barrel 39 of plate 33.

A flared lip 40 on said lower plate flared upwards toward said second plate is preferably located along an edge opposite said hinge bolt 37 and barrel 39 of lower plate 33.

As illustrated in FIG. 6, upper plate 32 is narrower in width than lower plate 33 so that the web portion of a channel beam can be accommodated between flared lip 40 of the lower plate and edge 41 of the upper plate 32.

Figure 7:
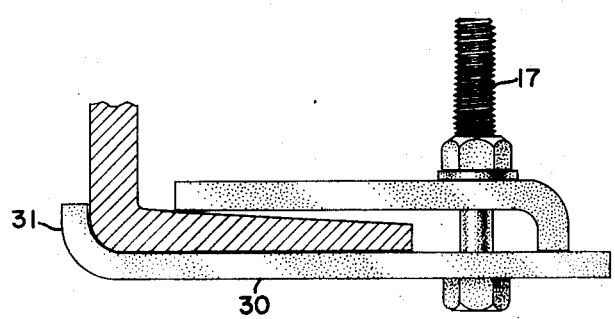
FIG. 7 is an elevational view of a clamp having an alternative lower plate.

An alternative clamp device is illustrated in FIG. 7 wherein the lower plate 30 has only one flared lip. The clamp device of FIG. 7 is secure about the channel since lip 31 prevents the clamp from slipping in one direction and bolt 17 prevents slipping in the other direction.

The invention described herein is particularly useful in permitting towing of a tandem axle trailer for a short duration without removing a flat tire. It can be utilized instead of a spare tire and wheel, since it permits a trailer with a flat tire to be towed to a repair station without inflicting damage to the tire or wheel.

I claim:

1. Temporary axle support device for tandem wheeled trailers having an elongated U-shaped channel beam support with the flange portions extending horizontally comprising a. a base plate having a width greater than the width of said U-shaped channel beam and having a hole therein near one edge to accomodate a bolt;

b. a clamp plate having a hole near one edge and sufficient width to overlap the upper portion of a flange of said channel beam when the hole thereof is vertically aligned with the hole of the base plate;

c. bolt means extending through said base plate and clamp plate with sufficient length extending above said clamp plate to engage at least two links of a heavy duty chain;

d. chain means having sufficient length to extend doubled from said channel beam beneath an axle attached by spring means to said frame.

2. The axle support device of claim 1 wherein the clamp plate has a fulcrum projection on its lower surface between the hole therein and the edge adjacent said bolt hole adapted to contact said base plate at a position between the bolt hole and adjacent edge of said base plate.

3. The axle support device of claim 1 wherein the base plate has a flared lip along the edge opposite the edge adjacent said bolt hole.

4. The axle support device of claim 1 wherein the base plate has a flared lip along two opposed edges, one of said edges being adjacent said bolt hole.

5. The axle support device of claim 2 wherein said fulcrum projection is a flared lip along the edge of said plate adjacent the bolt hole.

6. The axle support device of claim 1 wherein said clamp plate is about two-thirds the width of said base plate.

7. The axle support device of claim 1 wherein base plate and clamp plate are steel plates having a minimum thickness of about one-quarter inch.

8. The axle support device of claim 1 wherein said base plate and clamp plate are hinged along the edges thereof adjacent said bolt holes.

9. The axle support device of claim 1 wherein said bolt means is a steel bolt having a minimum thickness of about three-eights inch and a minimum height of about 2 inches.

10. The axle support device of claim 2 wherein said fulcrum projection projects below the lower surface of said clamp plate about one-quarter inch.

* * * * *